United States Patent
Seo et al.

(10) Patent No.: US 8,831,043 B2
(45) Date of Patent: Sep. 9, 2014

(54) METHOD AND SYSTEM FOR OPERATING COOPERATIVE RECEIVING DIVERSITY SCHEME AND SELECTIVE COOPERATIVE RELAYING

(75) Inventors: Bangwon Seo, Daejeon (KR); Heesoo Lee, Daejeon (KR); Jae Young Ahn, Daejeon (KR); Hyun Kyu Chung, Daejeon (KR); Chung Gu Kang, Daejeon (KR); Hyun Seok Ryu, Daejeon (KR); Jung Jae Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 334 days.

(21) Appl. No.: 12/745,520

(22) PCT Filed: Jun. 19, 2008

(86) PCT No.: PCT/KR2008/003474
§ 371 (c)(1),
(2), (4) Date: May 28, 2010

(87) PCT Pub. No.: WO2009/069870
PCT Pub. Date: Jun. 4, 2009

(65) Prior Publication Data
US 2010/0303032 A1 Dec. 2, 2010

(30) Foreign Application Priority Data
Nov. 29, 2007 (KR) .................. 10-2007-0122627

(51) Int. Cl.
*H04J 1/00* (2006.01)
*H04B 7/02* (2006.01)
(52) U.S. Cl.
CPC .................... *H04B 7/026* (2013.01)
USPC ........... 370/492; 370/279; 370/274; 370/315; 455/7

(58) Field of Classification Search
CPC ........................................ H04B 7/026
USPC .................. 370/436, 492, 279, 274, 315
See application file for complete search history.

(56) References Cited

U.S. PATENT DOCUMENTS

| 2004/0266339 A1 | 12/2004 | Larsson | |
| 2008/0240018 A1* | 10/2008 | Xue et al. | 370/328 |
| 2010/0046413 A1* | 2/2010 | Jin et al. | 370/315 |

FOREIGN PATENT DOCUMENTS

| EP | 1657854 A1 | 5/2006 |
| KR | 1020060098360 | 9/2006 |

(Continued)

OTHER PUBLICATIONS

Laneman, J. Nicholas et al., "Cooperative Diversity in Wireless Networks: Efficient Protocols and Outage Behavior," IEEE Transactions on Information Theory, vol. 50(12):3062-3080 (2004).

(Continued)

*Primary Examiner* — Omer S Mian
(74) *Attorney, Agent, or Firm* — Nelson Mullins Riley & Scarborough LLP; Anthony A. Laurentano, Esq.; Dipti Ramnarain, Esq.

(57) ABSTRACT

A selective cooperative relaying method, the method including: determining, by a base station, whether a mobile station for which the base station provides a service is the mobile station necessary for direct transmission or is the mobile station necessary for cooperative relaying via a relay station; and selecting, by a base station, mobile stations using a simple relaying scheme, a cooperative transmission diversity scheme, or a cooperative receiving diversity scheme from mobile stations necessary for the cooperative relaying via the relay station.

4 Claims, 8 Drawing Sheets

(56) References Cited

FOREIGN PATENT DOCUMENTS

| KR | 1020070067910 | 6/2007 |
|----|---------------|--------|
| KR | 1020070080367 | 8/2007 |
| WO | 2005/064872 A1 | 7/2005 |

OTHER PUBLICATIONS

Nosratinia, Aria et al., "Cooperative Communication in Wireless Networks," IEEE Communications Magazine, vol. 42 (10):74-80 (2004).

* cited by examiner

US 8,831,043 B2

METHOD AND SYSTEM FOR OPERATING COOPERATIVE RECEIVING DIVERSITY SCHEME AND SELECTIVE COOPERATIVE RELAYING

RELATED APPLICATIONS

This application is a 35 U.S.C. §371 national stage filing of PCT Application No. PCT/KR2008/003474 filed on Jun. 19, 2008, which claims priority to, and the benefit of, Korean Patent Application No. 10-2007-0122627 filed on Nov. 29, 2007. The contents of the aforementioned applications are hereby incorporated by reference.

TECHNICAL FIELD

The present invention relates to a method of operating a cooperative receiving diversity scheme and a selective cooperative relaying method and system, and more particularly, to a method of operating a cooperative receiving diversity scheme and a selective cooperative relaying method and system that can provide a selection standard of simultaneously considering a performance enhancement effect based on various cooperative relaying schemes, and efficiency of wireless resource allocation, thereby maintaining favorable service outage performance and maximizing throughput using a selective cooperative relaying scheme.

This work was supported by the IT R&D program of MIC/IITA [2006-S-001-02, Development of Adaptive Radio Access and Transmission Technologies for 4th Generation Mobile Communications].

BACKGROUND ART

Generally, a cooperative relaying scheme is a communication scheme of transmitting a signal using a plurality of paths generated by at least two communication nodes having an equivalent function, relaying the signal to a destination via at least one path, combining or selecting the signal received from the plurality of paths, and inferring transmission information.

An existing cooperative relaying scheme may be embodied as various types, and the cooperative relaying scheme having been researched until now may be generally classified into a simple relaying scheme, a cooperative transmission diversity scheme, or a cooperative receiving diversity scheme.

The simple relaying scheme (Institute of Electrical and Electronics Engineers (IEEE) 802.16j Baseline Document, IEEE 802.16j-06/026r4) may divide an entire cell into a plurality of small coverage areas using a plurality of relay stations. In this instance, all relay nodes may reuse the same wireless resource, thereby increasing an additional system volume, however, a service outage rate increases due to high-efficient modulation based on a Carrier to Interference and Noise Ratio (CINR) and interference between cells due to frequency reuse. As described above, the simple relaying scheme has a limit due to service outage in a relay station coverage boundary despite a throughput increase effect using the relay station.

The cooperative transmission diversity scheme (IEEE 802.16j Baseline Document, IEEE 802.16j-06/026r4) is a scheme of acquiring a diversity gain since either a base station or a relay station performs space-time coding. In this instance, the space-time coding uses Alamouti coding, and is respectively classified into full encoding and half encoding based on whether the coding is performed by the base station or is performed by the relay station. Generally, a cellular system uses a Decode-and-Forward scheme by which the relay station performs modulation and demodulation and transmits a signal to the mobile station. Transmission must be simultaneously performed in two nodes in order to perform a conventional cooperative transmission diversity scheme. In the conventional cooperative transmission diversity scheme, when the cooperative receiving diversity scheme is performed using two relay stations, the signal must be transmitted from the two relay stations to the mobile station, and resources must be respectively allocated to the two relay stations. As described above, since the conventional cooperative transmission diversity scheme abandons a portion of resources allocated for the mobile station for which the relay station provides a service in order to secure two diversity paths, band efficiency decreases due to additional resource allocation despite performance enhancement due to the cooperative receiving diversity scheme.

The cooperative receiving diversity scheme (J. N. Laneman, D. N. C Tse and G. W. Wornell, Cooperative Diversity in Wireless Networks: Efficient Protocols and Outage Behavior, IEEE Trans. Inform. Theory, Vol. 50, No. 12, December 2004) does not require additional resources for securing a diversity path since the mobile station overhears the signal when the base station transmits the signal to the relay station. However, since a conventional cooperative receiving diversity scheme requires an additional process for reporting in advance when and via which area resource the signal is transmitted by the base station so that the mobile station may overhear the signal transmitted from the base station, the band efficiency decreases as the additional resources are consumed for performing the additional process.

Accordingly, a selection standard of adaptively selecting a cooperative relaying scheme by reflecting an advantage and a disadvantage of the conventional simple relaying scheme, the cooperative transmission diversity scheme, and the cooperative receiving diversity scheme needs to be disclosed.

DISCLOSURE OF INVENTION

Technical Problem

The present invention provides a selective cooperative relaying method and system that can adaptively apply a selection standard of simultaneously considering a performance enhancement effect based on various cooperative relaying schemes and efficiency of wireless resource allocation including overhead, thereby maintaining service outage performance superior to service outage performance of an existing system and maximizing throughput.

The present invention also provides a method and system of operating a cooperative receiving diversity scheme that can provide a standard for selectively using a direct transmission scheme, a simple relaying scheme, a cooperative transmission diversity scheme, or a cooperative receiving diversity scheme when cooperative relaying is performed using the direct transmission scheme, the simple relaying scheme, the cooperative transmission diversity scheme, or the cooperative receiving diversity scheme.

Technical Solution

According to an aspect of the present invention, there is provided a method of operating a cooperative receiving diversity scheme, the method including: relaying, by a base station, resource allocation information so that a mobile station may overhear the resource allocation information being included in information about a resource area allocated to each relay station; and receiving, from the relay station by the base station, information about the mobile station for which the relay station provides a service.

According to another aspect of the present invention, there is provided a selective cooperative relaying method, the method including: determining, by a base station, whether a mobile station for which the base station provides a service is the mobile station necessary for direct transmission or is the mobile station necessary for cooperative relaying via a relay station; and selecting, by a base station, mobile stations using a simple relaying scheme, a cooperative transmission diversity scheme, or a cooperative receiving diversity scheme from mobile stations necessary for the cooperative relaying via the relay station.

According to still another aspect of the present invention, there is provided a selective cooperative relaying method, the method including: receiving, by a base station, channel quality measurement information from a mobile station and a relay station; determining, by the base station, a direct transmission scheme or a cooperative relaying scheme; calculating, by the base station, an equivalent burst transmission rate based on the cooperative relaying scheme when the cooperative relaying scheme is determine; and selecting, by the base station, any one of cooperative relaying schemes based on the equivalent burst transmission rate.

According to yet another aspect of the present invention, there is provided a system for operating a cooperative receiving diversity scheme, the system including: a base station to relay resource allocation information so that a mobile station may overhear the resource allocation information being included in information about a resource area allocated to each relay station.

According to a further aspect of the present invention, there is provided a selective cooperative relaying system, the system including: a base station to receive channel quality measurement information from a mobile station, to determine a direct transmission scheme or a cooperative relaying scheme based on the channel quality measurement information, to calculate an equivalent burst transmission rate based on the cooperative relaying scheme when the cooperative relaying scheme is determined, and to select any one of cooperative relaying schemes based on the equivalent burst transmission rate.

MODE FOR THE INVENTION

Figure 1:
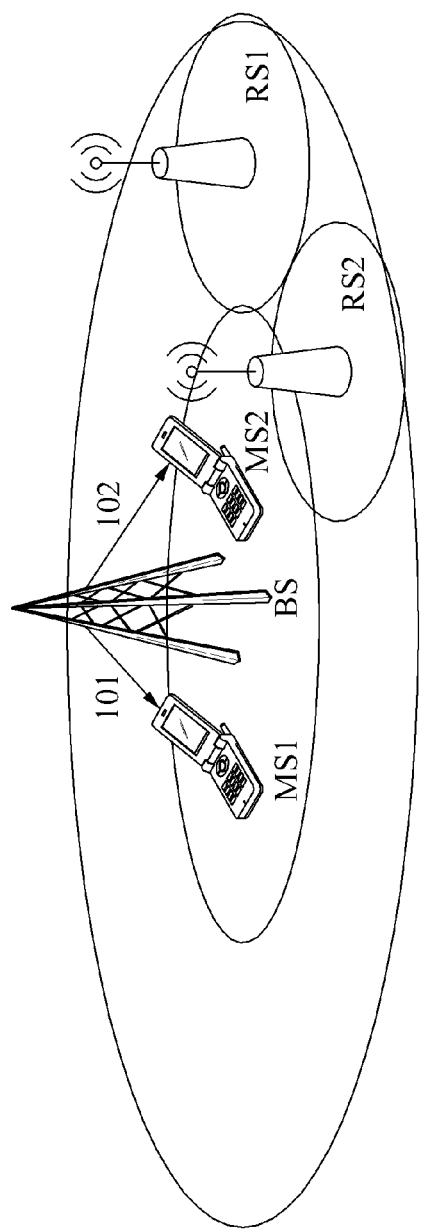
FIG. 1 illustrates an example of operations of a direct transmission scheme being a comparison scheme with an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, a method and system of operating a cooperative receiving diversity scheme and a selective cooperative relaying method and system are described in detail with reference to the attached drawings.

FIG. 1 illustrates an example of operations of a direct transmission scheme being a comparison scheme with an exemplary embodiment of the present invention.

Referring to FIG. 1, the direct transmission scheme is a scheme of respectively transmitting a signal directly to mobile stations (MSs) MS 1 and MS 2 located in a coverage area covered by a base station (BS) (101 and 102). As described above, direct communication among the BS, MS 1, and MS 2 is performed using the direct transmission scheme.

Figure 2:
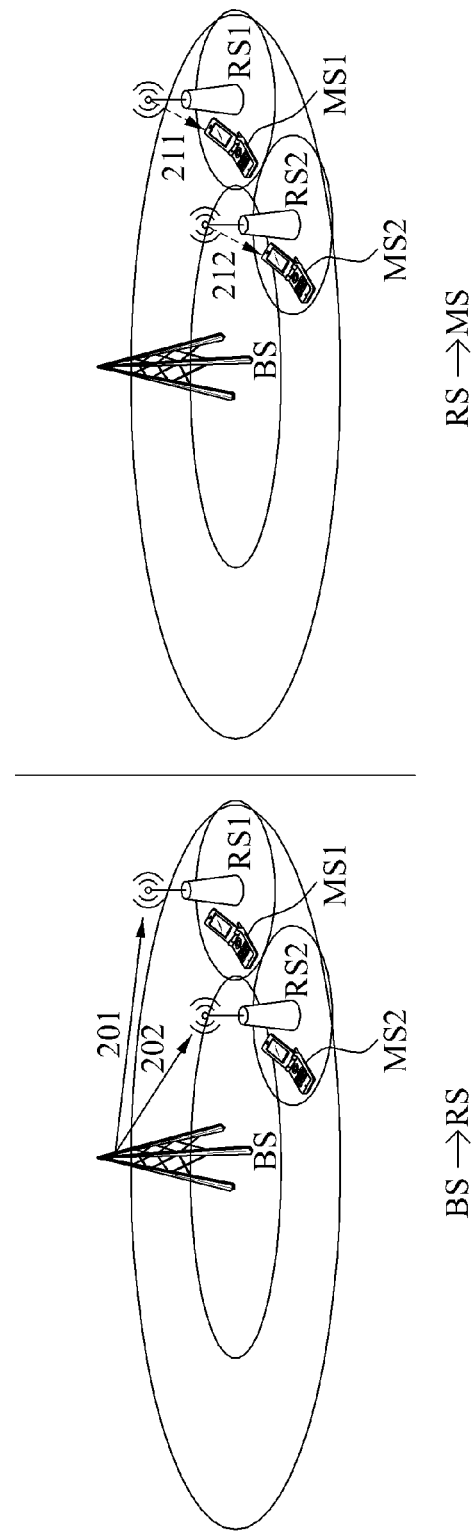
FIG. 2 illustrates an example of operations for each time division slot of a simple relaying scheme being a comparison scheme with an exemplary embodiment of the present invention.

FIG. 2 illustrates an example of operations for each time division slot of a simple relaying scheme being a comparison scheme with an exemplary embodiment of the present invention.

Referring to FIG. 2, the simple relaying scheme respectively transmits a signal from a BS to relay station (RS) 1 and RS 2 (201 and 202), and respectively transmits a signal from RS 1 and RS 2 to MS 1 and MS 2 in a coverage area (211 and 212). As described above, the simple relaying scheme does not perform direct communication among the BS, MS 1, and MS 2, and relays the signal to a destination node using either an upstream link or a downstream link via a single RS or a plurality of RSs (RS 1 and RS 2) located in a middle.

A cooperative transmission diversity scheme may be performed using the BS and the single RS (RS 1), and may be performed using the two RSs (RS 1 and RS 2). A case where the cooperative transmission diversity scheme is performed using the two RSs (RS 1 and RS 2) is described.

Figure 3:
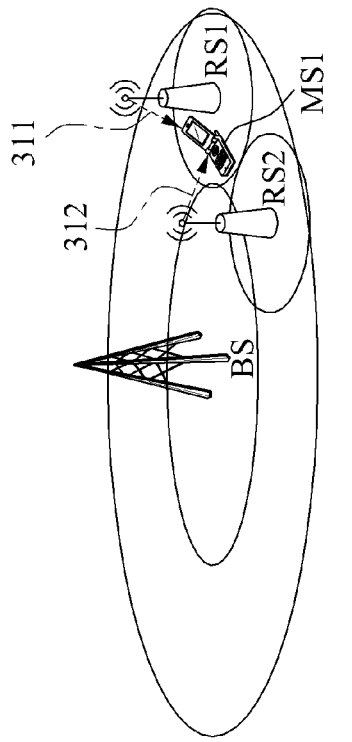
FIG. 3 illustrates an example of operations for each time division slot of a cooperative transmission diversity scheme being a comparison scheme with an exemplary embodiment of the present invention.
Figure 3:
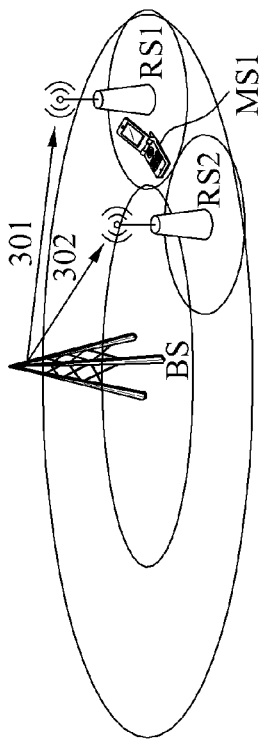

FIG. 3 illustrates an example of operations for each time division slot of a cooperative transmission diversity scheme being a comparison scheme with an exemplary embodiment of the present invention.

Referring to FIG. 3, the cooperative transmission diversity scheme respectively transmits a signal from a BS to RS 1 and RS 2 (301 and 302), and respectively transmits a signal from RS 1 and RS 2 to MS 1 (311 and 312).

Figure 4:
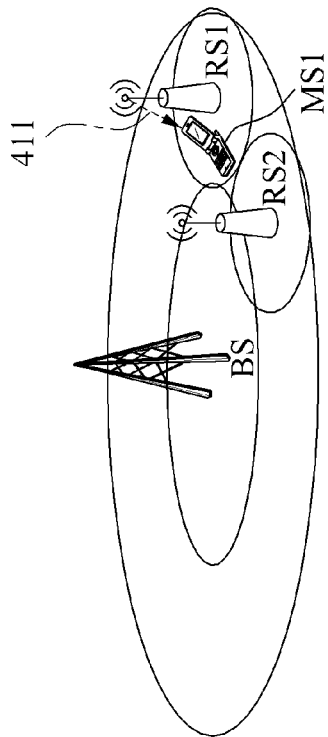
FIG. 4 illustrates an example of operations for each time division slot of a cooperative receiving diversity scheme being a comparison scheme with an exemplary embodiment of the present invention.
Figure 4:
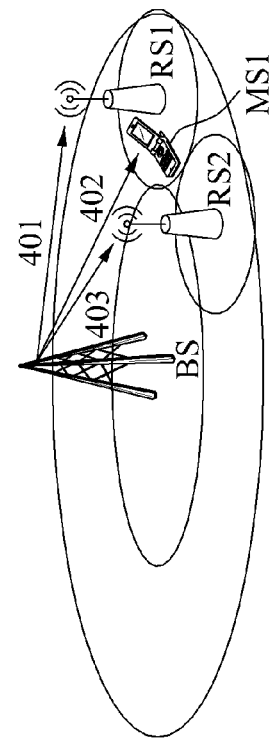

FIG. 4 illustrates an example of operations for each time division slot of a cooperative receiving diversity scheme being a comparison scheme with an exemplary embodiment of the present invention.

Referring to FIG. 4, the cooperative receiving diversity scheme respectively transmits a signal from a BS to RS 1, RS 2, and MS 1 (401 and 403). In this instance, MS 1 overhears the signal transmitted from the BS to RS 1 and RS 2 (402). RS 1 transmits, to MS 1, the signal transmitted from the BS (411).

Figure 5:
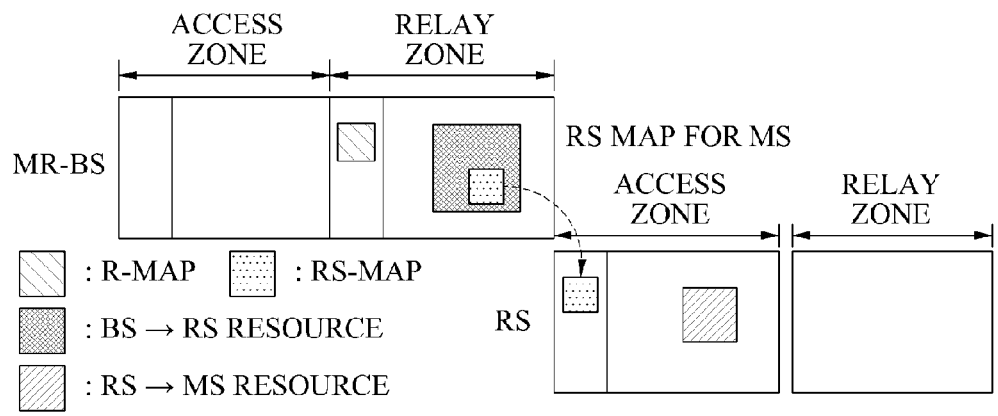
FIG. 5 illustrates resource allocation and an operation process for a simple relaying scheme being a comparison scheme with an exemplary embodiment of the present invention.

FIG. 5 illustrates resource allocation and an operation process for a simple relaying scheme being a comparison scheme with an exemplary embodiment of the present invention.

Referring to FIG. 5, when a data burst is simply relayed to an MS via an RS, a resource is respectively allocated covering a relay zone and an access zone. In this instance, an equivalent transmission rate is determined based on a channel state of the MS in each zone. The resource used based on a simple relaying process is classified into a resource for transmitting MAP information and a resource for transmitting data burst information. The MAP information are classified into information about a resource area allocated to each RS in the relay zone (indicating R-MAP in the accompanying drawings), and information about a resource area allocated to the MS accessing each RS in an access zone of a subsequent frame (indicating RS-MAP in the accompanying drawings). The MS simultaneously transmits RS-MAP information along with the data burst to the RS in the relay zone. The RS relays the RS-MAP information and the data burst to the MS using the access zone of the RS in the subsequent frame.

Figure 6:
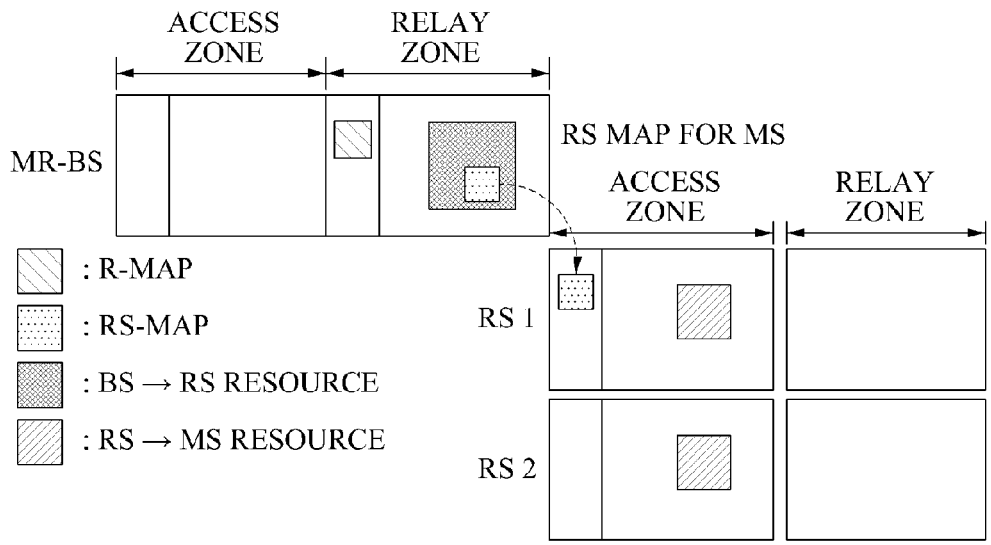
FIG. 6 illustrates resource allocation and an operation process for a cooperative transmission diversity scheme being a comparison scheme with an exemplary embodiment of the present invention.

FIG. 6 illustrates resource allocation and an operation process for a cooperative transmission diversity scheme being a comparison scheme with an exemplary embodiment of the present invention.

Referring to FIG. 6, the cooperative transmission diversity scheme is similar to a simple relaying scheme, however, since a data burst is transmitted via two RSs (RS 1 and RS 2), a double amount of resource is used in an access zone.

Figure 7:
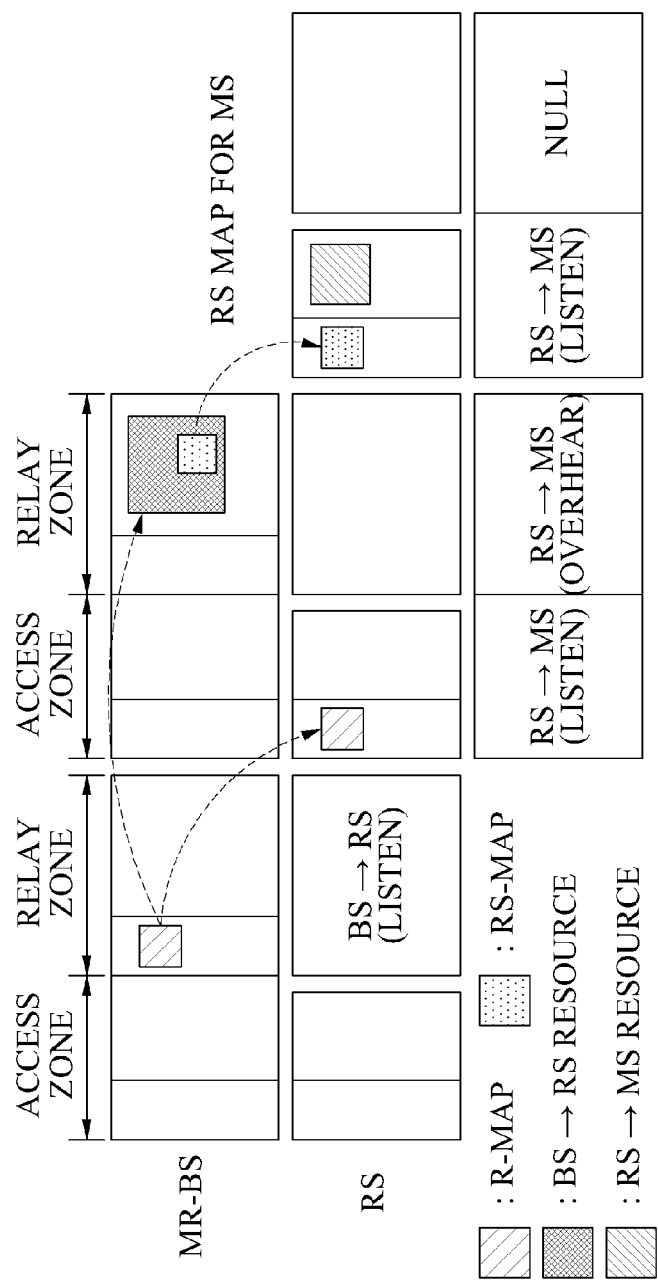
FIG. 7 illustrates resource allocation and an operation process for applying a cooperative receiving diversity scheme to an Institute of Electrical and Electronics Engineers (IEEE) 802.16e-based system according to an exemplary embodiment of the present invention.

FIG. 7 illustrates resource allocation and an operation process for applying a cooperative receiving diversity scheme to an Institute of Electrical and Electronics Engineers (IEEE) 802.16e-based system according to an exemplary embodiment of the present invention.

Referring to FIG. 7, a BS must first relay a portion (R-MAP) denoting a resource allocation area in a relay zone to an MS via an RS in a previous frame before a data burst is actually transmitted so that MSs located in a service area of the RS may overhear data burst transmission in the relay zone. Accordingly, since the R-MAP passes through two relaying processes, a size of the R-MAP doubles, compared with a size of R-MAP needing to be actually transmitted.

The BS relays resource allocation information so that the MS may overhear the resource allocation information being included in a MAP portion (R-MAP) for the RS. The BS relays the resource allocation information for the MS, the resource allocation information being included in the portion (R-MAP) denoting the resource allocation information for the RS in a cell so that the MS for the cooperative receiving diversity scheme may overhear the resource allocation information.

The RS transmits the R-MAP received from the BS to the MS using RS-MAP for the MS located in a service area of the RS. The RS transmits the resource allocation information received from the BS for the cooperative receiving diversity scheme to the MS for which the RS provides a service.

The MS overhears the information transmitted from the BS to the RS. The MS having received the R-MAP overhears allocation information about the resource transmitted from the BS to the RS.

The MS receives corresponding information of the MS from the RS. The MS receives, from the RS, a data burst being information being original information of the MS.

The MS combines overheard information and the received information. The MS combines the overheard information and the received data burst.

As described above, in the cooperative receiving diversity scheme according to an exemplary embodiment of the present invention, the MS having received the R-MAP overhears in a corresponding area, and a gain occurs by combining the R-MAP with the data burst received in the subsequent frame.

Figure 8:
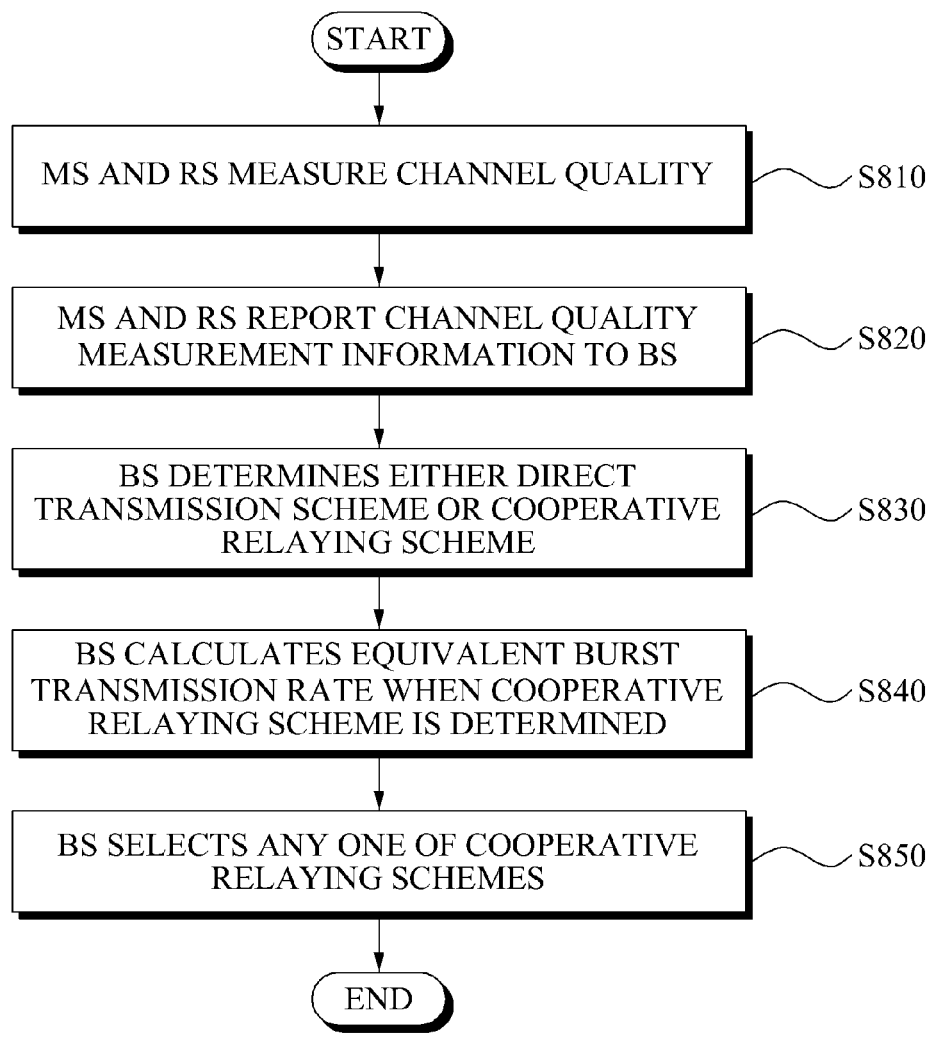
FIG. 8 illustrates a process for selecting a cooperative relaying scheme according to an exemplary embodiment of the present invention.

FIG. 8 illustrates a process for selecting a cooperative relaying scheme according to an exemplary embodiment of the present invention.

Referring to FIG. 8, in operation S810, an MS and an RS measure a channel quality.

In operation S820, the MS and the RS report channel quality measurement information to a BS. The BS receives the channel quality measurement information from the MS and the RS.

In operation S830, the BS determines whether the MS is the MS necessary for direct transmission or is the MS necessary for cooperative relaying via the RS. In operation S830, the BS determines whether the mobile station is the MS necessary for the direct transmission or is the MS necessary for the cooperative relaying via the RS using the channel quality measurement information received from the MS. In operation S830, the BS may compare a Signal to Interference Ratio (SIR) acquired using the direct transmission and an SIR acquired using the cooperative relaying, and determine a communication scheme having a high gain based on a result of the comparing of the SIRs. For example, when the SIR acquired using the direct transmission is lower than the SIR acquired using the cooperative relaying, the BS may determine the communication scheme of the MS as the cooperative relaying scheme.

In operation S840, when the cooperative relaying scheme is determined, the BS calculates an equivalent burst transmission rate. In operation S840, when the cooperative relaying scheme is determined, the BS calculates the equivalent burst transmission rate based on a simple relaying scheme, a cooperative transmission diversity scheme, or a cooperative receiving diversity scheme.

$$\frac{N_{burst}}{R_{eff}^{(SR)}} = \frac{N_{R-MAP}}{R_{MAP}} + \frac{N_{burst} + N_{RS-MAP}}{R(\gamma_{BS,RS})} + \frac{N_{RS-MAP}}{R_{MAP}} + \frac{N_{burst}}{R(\gamma_{RS,MS})},$$ [Equation 1]

where
$R_{eff}^{(SR)}$
denotes an equivalent burst transmission rate based on the simple relaying scheme described with reference to FIG. 2 and FIG. 5, and is calculated by the above-described Equation 1 using a sum of transmission times used for transmitting a data burst and overhead.

$N_{burst}$
denotes a size of the data burst,
$N_{R-MAP}$ denotes an amount of overhead for denoting resource allocation information of each RS in a cell, and $N_{RS\text{-}MAP}$
denotes an amount of overhead for denoting resource allocation information of MSs located in a service area of an RS.

$R_{MAP}$
denotes a transmission rate for transmitting the $N_{R\text{-}MAP}$
and the $N_{RS\text{-}MAP}$.

$R(\gamma_{BS,RS})$
denotes a transmission rate corresponding to a link between a BS and an RS, and $R(\gamma_{RS,MS})$
denotes a transmission rate corresponding to a link between an RS and an MS.

$$\frac{N_{burst}}{R_{\mathit{eff}}^{(CTD)}} = \frac{N_{R-MAP}}{R_{MAP}} + \frac{N_{burst}+N_{RS-MAP}}{R(\gamma_{BS,RS})} + \frac{N_{RS-MAP}}{R_{MAP}} + \frac{2N_{burst}}{R(\gamma_{MS}^{(CTD)})}, \quad \text{[Equation 2]}$$

where
$R_{\mathit{eff}}^{(CTD)}$
denotes an equivalent burst transmission rate based on the cooperative transmission diversity scheme described with reference to FIG. 3 and FIG. 6, and is calculated by the above-described Equation 2 using a sum of transmission times used for transmitting a data burst and overhead.

$R(\gamma_{MS}^{(CTD)})$
denotes a transmission rate corresponding to a Carrier to Interference and Noise Ratio (CINR) of a received signal acquired using a combination gain in a link between two RSs and the MS.

$$\frac{N_{burst}}{R_{\mathit{eff}}^{(CTD)}} = \frac{2N_{R-MAP}}{R_{MAP}} + \frac{N_{burst}+N_{RS-MAP}}{R(\gamma_{BS,RS})} + \frac{N_{RS-MAP}}{R_{MAP}} + \frac{N_{burst}}{\tilde{R}(\gamma_{BS,MS},\gamma_{RS,MS})}, \quad \text{[Equation 3]}$$

where
$R_{\mathit{eff}}^{(CRD)}$
denotes an equivalent burst transmission rate based on a cooperative receiving diversity scheme described with reference to FIG. 4 and FIG. 7, and is calculated by the above-described Equation 3 using a sum of transmission times used for transmitting a data burst and overhead.

$\tilde{R}(\gamma_{BS,MS},\gamma_{RS,MS})$
denotes a transmission rate corresponding to a CINR of a received signal acquired using combination gains in a link between a BS and an MS, and a link between an RS and an MS.

In operation S850, the BS selects any one of cooperative relaying schemes based on the equivalent burst transmission rate. In operation S850, the BS selects a cooperative relaying scheme of maximizing transmission efficiency based on the equivalent burst transmission rate calculated using the above-described Equations 1 through 3. For example, in operation S850, the BS selects the cooperative relaying scheme of maximizing the equivalent burst transmission rate based on a simple relaying scheme, a cooperative transmission diversity scheme, or a cooperative receiving diversity scheme.

Figure 9:
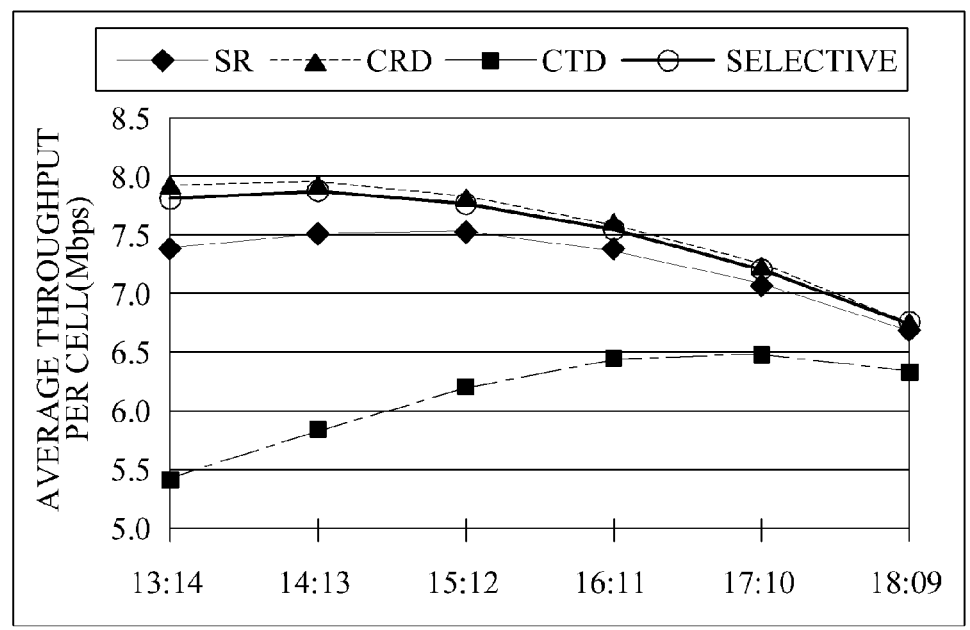
FIG. 9 illustrates average throughputs per cell of comparison schemes with an exemplary embodiment of the present invention and an exemplary embodiment the present invention.

FIG. 9 illustrates average throughputs per cell of comparison schemes with an exemplary embodiment of the present invention and an exemplary embodiment the present invention.

Referring to FIG. 9, an average throughput per cell is an experimental result based on varying a ratio of an access zone to a relay zone from 13:14 to 18:9. This denotes a result with respect to the average throughput per cell of varying a boundary of the access zone and the relay zone when ten users per cell are assumed, a full buffer model is used, and overhead for each MS is 12 bits. The average throughputs per cell in the case of using a direct transmission scheme (DT) and a simple relaying scheme (SR), the case of using the DT and a Cooperative Transmission Diversity scheme (CTD), and the case of using the DT and a Cooperative Receiving Diversity scheme (CRD), and the average throughput per cell a selective cooperative relaying scheme (Selective) according to an exemplary embodiment of the present invention are different from each other.

As described above, the selective cooperative relaying scheme according to an exemplary embodiment of the present invention may enhance throughput, compared with an existing system using only a simple relaying scheme.

Since throughput performance of the selective cooperative relaying scheme is slightly lower than throughput performance of the cooperative receiving diversity scheme does not fulfill a minimum transmission rate, a resource is not allocated. Accordingly, some MSs in an outage state select the cooperative transmission diversity scheme. Therefore, a portion of the resource is allocated, however a corresponding transmission rate is low, thereby reducing the throughput. For example, MSs located in a boundary of the RS generally select the cooperative transmission diversity scheme.

However, when gains and losses of a service outage rate compared with the throughput performance are described with reference to FIG. 10, the selective cooperative relaying method according to an exemplary embodiment of the present invention may significantly reduce the service outage rate, compared with the cooperative receiving diversity scheme.

Figure 10:
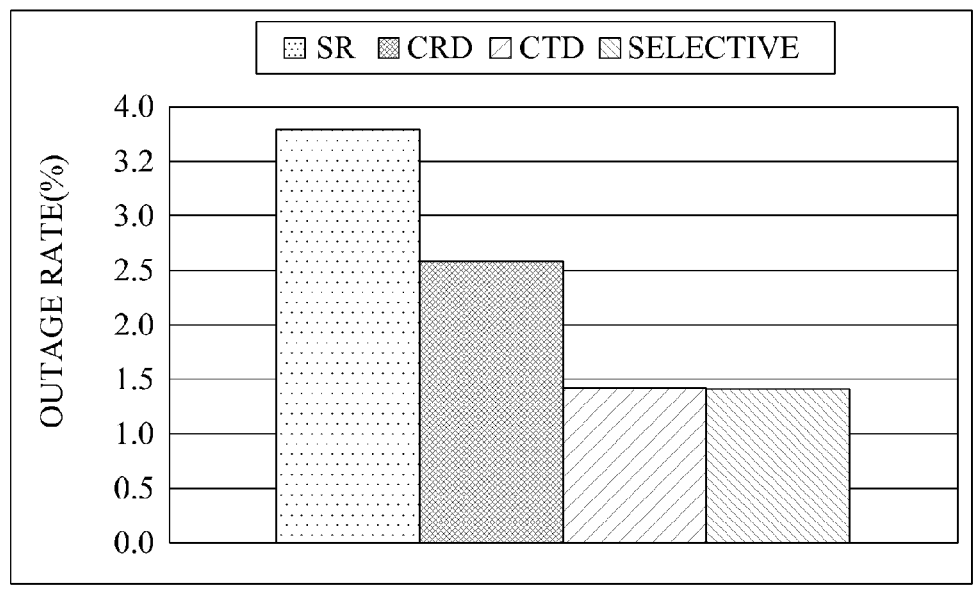
FIG. 10 illustrates outage rates of comparison schemes with an exemplary embodiment of the present invention and an exemplary embodiment the present invention.

FIG. 10 illustrates outage rates of comparison schemes with an exemplary embodiment of the present invention and an exemplary embodiment the present invention.

Referring to FIG. 10, service outage rates in the case of using a DT and an SR, the case of using the DT and a CTD, and the case of using the DT and a CRD being comparison schemes of the present invention, and a service outage rate with respect to the selective cooperative relaying method according to an exemplary embodiment of the present invention are different from each other. In this instance, service outage is defined as when even a lowest Adaptive Modulation and Coding (AMC) level is not received and a resource is not allocated, or when the resource is allocated and a packet is transmitted, however, an error occurs in the packet due to a receiving error.

As illustrated in FIG. 10, since the cooperative relaying scheme improves service outage performance, compared with the simple relaying scheme, the cooperative transmission diversity scheme is superior to the cooperative receiving diversity scheme, and the selective cooperative relaying scheme secures a lower service outage rate than any other scheme, the cooperative relaying scheme shows superior service outage performance than a conventional scheme of using only the simple relaying scheme.

Therefore, according to an exemplary embodiment of the present invention, a gain and loss relation between the throughput and service outage performance of the selective cooperative relaying scheme in a cellular mobile network may be verified, and a selection standard of simultaneously considering a performance enhancement effect and efficiency of wireless resource allocation may be adaptively applied, thereby improving the service outage performance and maximizing throughput performance using the selective cooperative relaying scheme, compared with the existing system.

According to the above-described exemplary embodiments of the present invention, there is provided a selective cooperative relaying method and system that can adaptively apply a selection standard of simultaneously considering a performance enhancement effect based on various cooperative relaying schemes and efficiency of wireless resource allocation including overhead, thereby maintaining service outage performance superior to service outage performance of an existing system and maximizing throughput.

Also, according to the above-described exemplary embodiments of the present invention, there is provided a method and system of operating a cooperative receiving diversity scheme that can provide a standard for selectively using a direct transmission scheme, a simple relaying scheme, a cooperative transmission diversity scheme, or a cooperative receiving diversity scheme when cooperative relaying is performed using the direct transmission scheme, the simple relaying scheme, the cooperative transmission diversity scheme, or the cooperative receiving diversity scheme.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of receiving transmission data, performed by a mobile station, the method comprising:
  receiving resource allocation information included in a resource area map from a base station, wherein the resource area map is transmitted in a first frame before a first data burst is transmitted to a relay station in a second frame, wherein the second frame is a Nth next frame of the first frame, and N is a natural number;
  overhearing the first data burst using the received resource allocation information;
  receiving a second data burst transmitted by the relay station, using a relay resource area map from the relay station for the mobile station; and
  combining the first data burst with the second data burst,
  wherein the resource allocation information indicates resource area allocated to the relay station.

2. The method of claim 1, wherein the relay station transmits the resource allocation information received from the base station to the mobile station according to a cooperative receiving diversity scheme.

3. A system for operating a cooperative receiving diversity scheme, the system comprising:
  a base station configured to transmit a resource allocation information included in a resource area map to a mobile station via a relay station, wherein the resource area map is transmitted in a first frame before a first data burst is transmitted to the relay station in a second frame, wherein the second frame is a Nth next frame of the first frame, and N is a natural number;
  a relay station configured to transmit a second data burst to the mobile station, using a relay resource area map from the relay station for the mobile station; and
  a mobile station configured to overhear the first data burst using the received resource allocation information, and combine the first data burst with the second data burst,
  wherein the resource allocation information indicates resource area allocated to the relay station.

4. The system of claim 3, wherein the relay station transmits the resource allocation information received from the base station to the mobile station according to the cooperative receiving diversity scheme.

* * * * *